United States Patent [19]

Newton et al.

[11] 3,950,549

[45] Apr. 13, 1976

[54] SWEETENING AGENTS

[75] Inventors: Kenneth Newton, Runcorn; Anthony John Hanson Sale, Sharnbrook, both of England

[73] Assignee: Lever Brothers Company, New York, N.Y.

[22] Filed: Sept. 25, 1974

[21] Appl. No.: 509,196

[30] Foreign Application Priority Data

Oct. 3, 1973 United Kingdom............... 46204/73

[52] U.S. Cl. .................. 426/96; 426/103; 426/548
[51] Int. Cl.² ........................................ A23L 1/236
[58] Field of Search ............ 426/89, 103, 213, 215, 426/217, 380, 96, 548, 648

[56] References Cited
UNITED STATES PATENTS

| | | | |
|---|---|---|---|
| 2,761,783 | 9/1956 | Ferguson | 426/380 |
| 3,170,800 | 2/1965 | Pader et al. | 426/103 X |
| 3,325,296 | 6/1967 | Braaten | 426/213 |
| 3,704,138 | 11/1972 | LaVia et al. | 426/215 |

FOREIGN PATENTS OR APPLICATIONS 977,482  12/1964  United Kingdom................. 426/213

*Primary Examiner*—A. Louis Monacell
*Assistant Examiner*—Esther L. Massung
*Attorney, Agent, or Firm*—Kenneth F. Dusyn; James J. Farrell; Melvin H. Kurtz

[57] ABSTRACT

A sweetening agent in particulate form which volume for volume has a sweetening power about equal to that of table granulated sugar (sucrose) and has a calorific value considerably less than that of table granulated sugar, has particles which comprise solid sugar occluded in a glassy matrix which is formed of a water-soluble relatively bland polysaccharide and contains a dissolved non-nutritive sweetener.

4 Claims, No Drawings

SWEETENING AGENTS

This invention relates to sweetening agents, more particularly to such agents as are in particulate form and have volume for volume a sweetening power about equal to that of table granulated sugar while having a calorific value considerably less than (i.e. less than ¾, preferably less than ⅔) that of table granulated sugar.

Such sweetening agents may take the form of glassy particles in which a non-nutritive sweetener (sometimes called an artificial or non-calorific sweetener) such as saccharin and its salts or cyclamic acid and its salts is present dissolved in a glassy matrix of water-soluble carbohydrate extender which consists predominantly of trisaccharides and/or higher polysaccharides and is bland (with practically no sweet taste when compared with sugar). The extender may for example be a starch hydrolysate of low dextrose equivalent, particularly (see British Pat. Specifications Nos. 1,176,246 and 1,183,593 and U.S. Pat. No. 3,325,296) a maize starch hydrolysate having a dextrose equivalent of 15 to 30, for example maltodextrin, or a waxy starch hydrolysate having a dextrose equivalent of 5 to 15. However, owing to the friability of the particles of such a product, a considerable proportion of it may be reduced to fines in the period between manufacture and retail sale. This spoils the appearance of the product at the table, and particularly its ability to glisten or reflect light irregularly in the way that ordinary table granulated sugar does.

The present invention provides a less friable particulate product, whose particles comprise solid sugar occluded in the glassy matrix formed by the water-soluble bland carbohydrate (polysaccharide) extender containing non-nutritive sweetener dissolved in it.

The size of table granulated sugar particles varies widely from country to country and even from one area to another, and accordingly no hard and fast dimensions can be set for the particles of the product of this invention. Preferably, however, the product is provided in a form passing a sieve of aperture size 1.5 mm and retained on a sieve of aperture size 0.25 mm. The particles of solid sugar present embedded in the polysaccharide/non-nutritive sweetener matrix will, of course, be correspondingly smaller.

The artificial sweetener employed to form the product of the invention may be saccharin or a salt thereof such as the sodium or calcium salt, a cyclamate (cyclohexylsulphamate) such as the sodium or calcium salt, or a mixture of saccharin and cyclamate compounds.

Preferably, the proportion of sugar in the product is from one third to two thirds by weight thereof; and a sugar content of 50 – 60% by weight is particularly preferred. The proportion of artificial sweetener employed will of course depend on its sweetness, and thus considerably less saccharin than cyclamate would be required; ordinarily, the content of artificial sweetener in the product will be within the range 0.25 to 10% by weight.

Preferred carbohydrate extenders are maltodextrin and the related starch hydrolysates referred to earlier in this specification.

The product of the invention can be made by evaporating a suspension of fine sugar particles in an aqueous solution of the carbohydrate extender and non-nutritive sweetener under reduced pressure, preferably a pressure less than 100 mm of mercury, to obtain a brittle, glassy foam, which is then broken up and classified to obtain a particulate product of the desired particle size simulating table granulated sugar. The preferred uncompacted (i.e. poured) bulk density is in the range 0.25 – 0.5 gm/cm$^3$, and particularly 0.33 – 0.45 gm/cm$^3$. The invention is further illustrated by the following Example:

EXAMPLE

Maltodextrin (dextrose equivalent 20; 21.4 kg) and saccharin (sodium salt; 0.2 kg) were put into the bowl of a mixer equipped with a planetary stirrer, and water (7.2 kg) was added rapidly with stirring. Stirring was continued until a uniform solution of maltodextrin and saccharin had formed.

To the stirred solution there was then added fine ('caster') sugar (18 kg; all passing 30 BS sieve, aperture size 0.5 mm; 60% retained by BS 44 sieve, aperture size 0.355 mm). Some, though very little, of the sugar dissolved, and there was obtained a slurry consisting essentially of particles of caster sugar suspended in a solution of maltodextrin and saccharin.

The slurry was then dried at 95°C in thin layers in steam-jacketed trays in a chamber at 50 mm mercury absolute pressure. After 2 hours the brittle coarse glass-like foam (moisture content less than 3% by weight) that had formed was scraped from the trays and crushed between rollers, and the coarse particles thus obtained were further reduced in a mill. The milled material was sieved, the fraction passing BS 12 (aperture size 1.4 mm) and retained on BS 60 (0.25 mm aperture) being collected as the product. (A typical yield is 70%) The particulate product consisted essentially of particles of caster sugar embedded in a glassy matrix of maltodextrin and saccharin. Its composition in terms of solids content was approximately sugar 55%; maltodextrin 44.5%; saccharin 0.5%. The bulk density of the uncompacted, free-flowing product was 0.35 gm/cm$^3$. It had an appearance resembling that of ordinary table granulated sugar in its translucency and its glistening aspect, and was relatively non-friable. It had not more than half the calorie content of table granulated sugar when used at the same volume.

The fines obtained during the earlier operations of milling and sieving consisted essentially of fragments of glassy matrix (i.e. material containing very little sugar). These can be mixed with starting material (maltodextrin, sugar and saccharin in appropriate proportions) and re-cycled.

What is claimed is:

1. A sweetening agent is particulate form which volume for volume has a sweetening power about equal to that of table granulated sugar and has a calorific value considerably less than that of table granulated sugar, whose particles consist essentially of solid sugar particles embedded in a glassy matrix of water-soluble relatively bland polysaccharide and a non-nutritive sweetener; said sugar forming one-third to two-thirds by weight, and said non-nutritive sweetener forming 0.25 to 10% by weight, of the particles; the uncompacted bulk density of said particulate-form sweetening agent being in the range of from 0.25 to 0.5 gm/cm$^3$.

2. A sweetening agent according to claim 1, in which the sugar forms from 50 to 60% by weight of the particles.

3. A sweetening agent according to claim 2, in which the non-nutritive sweetener is saccharin.

4. A method of making a sweetening agent as set forth in claim 5, comprising
   a. evaporating to dryness under reduced pressure a suspension of caster sugar particles in an aqueous solution of water-soluble relatively bland polysaccharide and a non-nutritive sweetener, in such concentrations that only a small proportion of the caster sugar is dissolved in said aqueous solution, to obtain a brittle glassy foam;
   b. subdividing the foam; and
   c. separating from the subdivided material thus formed, a particulate product in a form that passes through a sieve of aperture size 1.5 mm and is retained on a sieve of aperture size 0.25 to 0.5 gm/cm$^3$; said sugar forming one-third to two-thirds by weight, and said non-nutritive sweetener forming from 0.25 to 10% by weight, of the particulate product.

* * * * *